(12) United States Patent
Furuichi

(10) Patent No.: US 7,108,381 B2
(45) Date of Patent: Sep. 19, 2006

(54) PROJECTOR APPARATUS

(75) Inventor: Kunitaka Furuichi, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 11/342,528

(22) Filed: Jan. 31, 2006

(65) Prior Publication Data

US 2006/0126035 A1    Jun. 15, 2006

Related U.S. Application Data

(62) Division of application No. 10/779,761, filed on Feb. 18, 2004, now Pat. No. 7,029,131.

(30) Foreign Application Priority Data

Feb. 27, 2003   (JP) .............................. 2003-050965

(51) Int. Cl.
*G03B 21/28* (2006.01)
(52) U.S. Cl. ........................................ 353/98; 353/119
(58) Field of Classification Search ................. 353/98, 353/99, 119, 52, 56, 59
See application file for complete search history.

(56) References Cited

U.S. PATENT DOCUMENTS

| 6,390,627 | B1 | 5/2002 | Kuroda |
| 6,494,583 | B1 | 12/2002 | Lu |
| 6,527,397 | B1 | 3/2003 | Furuichi et al. |
| 6,773,115 | B1 | 8/2004 | Tseng et al. |
| 2003/0020886 | A1 * | 1/2003 | Sunaga ........................ 353/78 |

FOREIGN PATENT DOCUMENTS

| JP | 55-6937 | 6/1978 |
| JP | 63-232386 | 9/1988 |
| JP | 1-134491 | 5/1989 |
| JP | 5-249409 | 9/1993 |
| JP | 6-138356 | 5/1994 |
| JP | 6-77111 | 10/1994 |
| JP | 7-36107 | 2/1995 |
| JP | 8-7313 | 1/1996 |
| JP | 10-143081 | 5/1998 |
| JP | 11-327049 | 11/1999 |
| JP | 2000-221599 | 8/2000 |
| JP | 2001-154271 | 6/2001 |
| JP | 2001-296606 | 10/2001 |
| JP | 2002-55306 | 2/2002 |

* cited by examiner

*Primary Examiner*—William C. Dowling
(74) *Attorney, Agent, or Firm*—Young & Thompson

(57) ABSTRACT

There is provided a projector apparatus having an image forming optical system including a plate fixed to a housing, and a plurality of reflecting mirrors attached to the plate through respective holding members. The material of the reflecting mirrors, and the materials of the plate and the holding members have approximately equal coefficients of linear expansion. Sliding means is provided at a contact point between the housing and the plate for releasing an excessive force generated at the contact point.

2 Claims, 7 Drawing Sheets

PRIOR ART

PRIOR ART

PROJECTOR APPARATUS

This application is a division of application Ser. No. 10/779,761, filed on Feb. 18, 2004, now U.S. Pat. No. 7,029,131, the entire contents of which are hereby incorporated by reference.

BACKGROUND OF THE INVENTION

1. Field of the Invention

The present invention relates to a projector apparatus, and more particularly relates to a holding mechanism of an image forming optical system.

2. Description of the Related Art

A large number of projector apparatuses using an aspherical reflecting mirror in place of a projection lens have been used recently. There have conventionally been strict requirements for the precision of the distance between a display device such as a liquid crystal display device and a reflecting mirror, and the precisions of the distances between a plurality of reflecting mirrors. To meet these requirements, these distance precisions are maintained by increasing the precisions of respective parts constructing the projector apparatuses, and consequently the precision of the projector apparatuses is managed.

However, the structure of the conventional projector apparatus is not prepared for a temperature change due to heat generated by a heat generation source such as a lamp, and this temperature change is addressed by cooling the housing itself, and thus, reducing the temperature change of the overall projector apparatus, for example.

Description will now be given of a fundamental construction of the conventional projector apparatus with reference to FIG. 1. As shown in FIG. 1, reflecting mirrors 1 to 3 are fixed to plate 6 respectively through holding members 1a to 3a. The projector apparatus shown in FIG. 1 is also comprised of a fourth reflecting mirror upon which light reflected by reflecting mirror 3 falls, and the fourth reflecting mirror is also fixed to plate 6 through a holding member, not shown (for example, see Japanese Patent Laid-open Publication No. 55306/2002). In this projector apparatus, the respective component parts expand by heat under various conditions such as an ambient temperature change during the operation, an internal temperature increase due to heat generated by lamp 8, and a temperature increase due to an optical power, and consequently, distortions occur in plate 6, holding members 1a to 3a, the unillustrated holding member holding the fourth reflecting mirror, and the like. If the distances between reflecting mirrors excessively change as a result of these generated distortions, the quality of a projected image degrades, and the performance of the apparatus thus decreases.

As a cross sectional view in FIG. 2 shows, plate 6 is fixed to housing 9 using screws 15. Housing 9 is made of magnesium, and plate 6 is made of a material having a low coefficient of linear expansion. Thus, as shown in FIG. 1, when radiant heat ① from lamp 8 heats housing 9, a linear expansion occurs at location ②, and forces expanding housing 9 in directions ③ are generated, plate 6 warps in direction ④. In this state, it is not possible to maintain the quality of the projected image.

SUMMARY OF THE INVENTION

The present invention has been created to solve the above-described problems, and it is an objective of the present invention to provide a projector apparatus adapted to the temperature change without requiring an effort of cooling the housing. More particularly, it is an objective of the present invention to provide a projector apparatus having a compact and low-cost housing allowing a precise mount of an image forming optical system using a simple construction.

One projector apparatus according to the present invention includes a light source apparatus arranged in the housing, an image forming element which deflect light diverged from the light source apparatus, and an image forming optical system. The image forming optical system includes a plate fixed to a housing, and a reflecting mirror attached to this plate through a holding member. The material of the reflecting mirror and the materials of the holding member have approximately equal coefficients of linear expansion. And it is to be more desired that the material of the plate have low coefficients of linear expansion.

Another projector apparatus according to the present invention includes a light source apparatus arranged in the housing, an image forming element which receives light from the light source apparatus and forms an image for projection, and an image forming optical system. The image forming optical system includes a plate fixed to a housing, and a reflecting mirror attached to this plate through a holding member. A sliding mechanism is provided at a contact point between the plate and the housing for releasing an excessive force which is generated by a temperature change and acts on the contact point.

One sliding mechanism is a bush made of an elastic material, and interposed at the contact point between the plate and the housing. The bush couples the plate and the housing to each other such that when the excessive force is generated at the contact point between the plate and the housing due to a temperature change, the plate can move in the acting direction of the force.

Another sliding mechanism includes a magnet provided in the plate and a steel plate provided in the housing and attracted by the magnet. This sliding mechanism couples the plate and the housing to each other by the attractive force of the magnet. Therefore, when a force larger than the frictional resistance due to the attractive force of the magnet acts on the contact point between the plate and the housing, the plate moves in the acting direction of the force, thereby releasing the acting force.

Another sliding mechanism is comprised of a spring interposed at the contact point between the plate and the housing. This spring couples the plate and the housing to each other by pressing the plate against the housing. Therefore, when a force larger than the frictional resistance due to the pressing force of the spring acts on the contact point between the plate and the housing, the plate moves in the acting direction of the force, thereby releasing the acting force.

Another sliding mechanism includes the holding member which expands in a direction opposite to an expansion direction of the plate by a quantity approximately equal to the expansion of the plate when the temperature changes. Therefore, the distance between the holding member and the housing is maintained constant even if the temperature changes.

Another sliding mechanism includes a pin extended in the same direction as the plate expands, and a hole which the pin fits in. The pin is provided on the housing, and the hole is provided on the plate. This sliding mechanism couples the plate and the housing to each other by passing the pin through the hole. Therefore, a slide generated between the pin and the hole avoids the distortion of the plate due to a temperature change.

As described above, according to the present invention, there is provided a projector apparatus adapted to the temperature change without requiring an effort of cooling the housing. Therefore, even if temperature change, it is possible to maintain the quality of an image to be projected. Especially, since it is not necessary to provide cooling means, the housing can be compact and inexpensive.

The above and other objects, features and advantage of the present invention will become apparent from the following description with reference to the accompanying drawings which illustrate examples of the present invention.

BRIEF DESCRIPTION OF THE DRAWINGS

FIG. 4b is a cross sectional view taken along a line A—A in FIG. 4a;

DESCRIPTION OF THE PREFERRED EMBODIMENT

Figure 1:
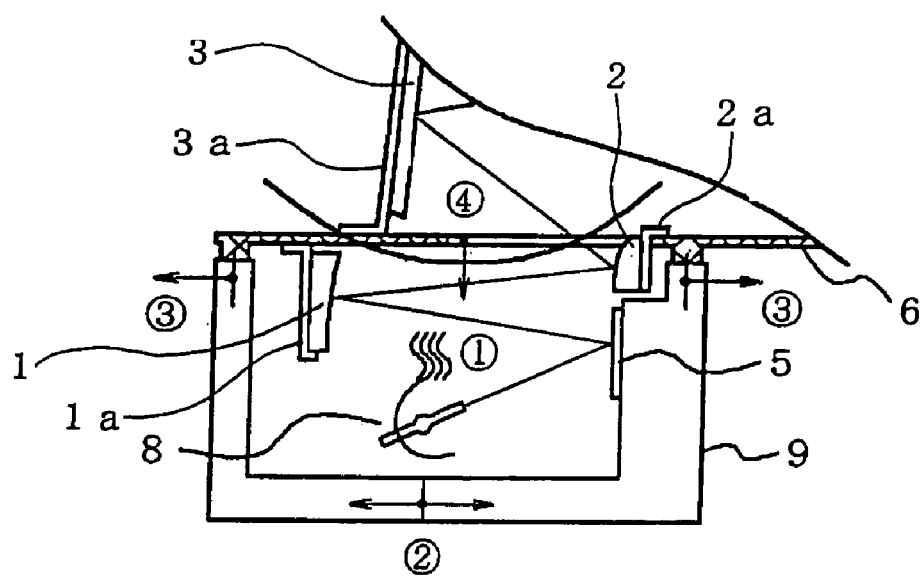
FIG. 1 is a schematic view showing problems of a conventional projector apparatus.

Description will now be given of a fundamental construction of a projector apparatus according to the present invention with reference to FIG. 3. Since the fundamental construction of the projector apparatus according to the present invention is similar to that of the conventional apparatus shown in FIG. 1, the description is provided while identical parts are designated by identical reference numerals.

Figure 3:
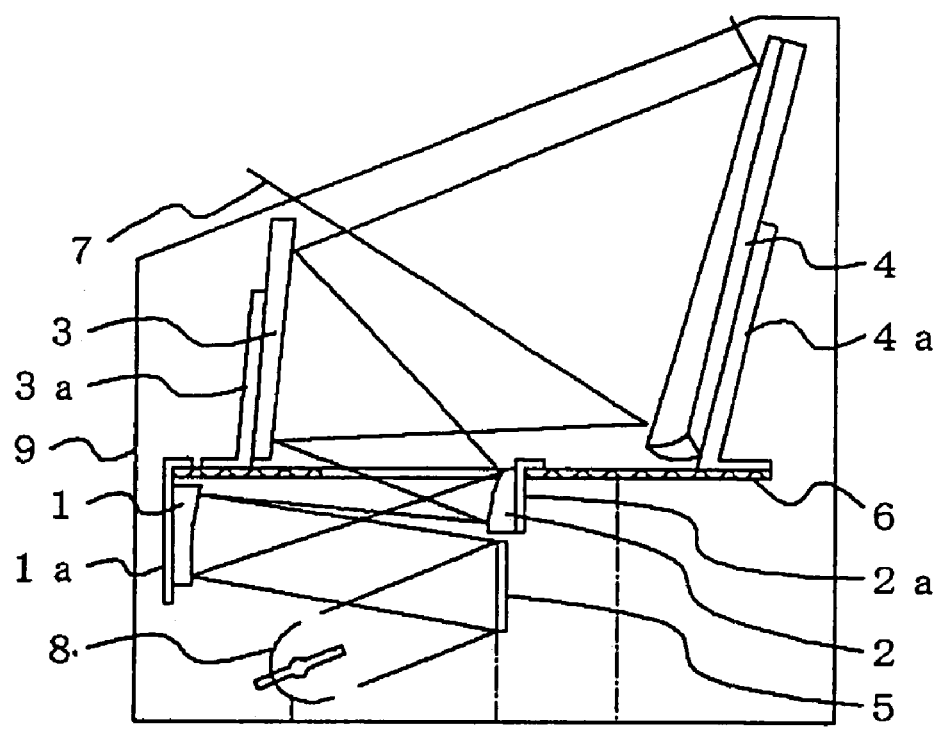
FIG. 3 is a schematic diagram showing a fundamental construction of a projector apparatus according to the present invention.

In FIG. 3, luminous flux radiated from lamp 8 is reflected on image forming element 5, then spreads and turns while being reflected by reflecting mirrors 1 to 4, finally becomes image forming light beam 7, and is projected on a screen (not shown). Reflecting mirrors 1 to 4 are fixed to plate 6 respectively through holding members 1a to 4a. To satisfy projection capability, the positional relationship between image forming element 5 and reflecting mirror 1, the positional relationship between reflecting mirror 1 and reflecting mirror 2, the positional relationship between reflecting mirror 2 and reflecting mirror 3, and the positional relationship between reflecting mirror 3 and reflecting mirror 4 are sequentially and highly precisely adjusted. Plate 6, image forming element 5, lamp 8, and the like are fixed to housing 9.

The projector apparatus constructed as described above characteristically has an adjusting mechanism or a sliding mechanism which adjusts the above-described positional relationships according to a temperature change, thereby maintaining the positional relationships between respective component parts highly precise. One adjusting mechanism is realized by holding members 1a to 4a and plate 6 made of an optimal material (such as a material having a coefficient of linear expansion of $1 \times 10^{-5}$/K or less, referred to as a low coefficient of linear expansion hereinafter). The sliding mechanism avoids a positional displacement and a distortion due to a temperature change. This adjusting mechanism or the sliding mechanism avoids an optical degradation (such a degradation which halves MTF of 401 p/mm to 201 p/mm) due to a temperature change.

Description will now be given of the case where optimal materials are selected for the parts, for example, a glass material is selected for reflecting mirrors 1 and 2, and a plastic material is selected for reflecting mirrors 3 and 4. When the reflecting mirrors are made of glass, since the change of the size due to a temperature change is small, if plastic or the like having a high coefficient of linear expansion is used for holding members 1a and 2a for respectively holding reflecting mirrors 1 and 2, reflecting mirrors 1 and 2 break and adhesions between reflecting mirrors 1 and holding member 1a, and between reflecting mirror 2 and holding member 2a are detached. Therefore, a plastic material having a low coefficient of linear expansion (such as RSP-6500 from SHOWA HIGH POLYMER CO., LTD) is selected as the materials of holding members 1a and 2a. As a result, a mechanical damage is avoided, and the surface shape of the reflecting mirrors is not distorted at the same time.

When a plastic material sensitive to a temperature change is used for reflecting mirrors 3 and 4, if a plastic material having a low coefficient of linear expansion similar to the above-described material is used for holding members 3a and 4a, a smooth distortion is obstructed, and consequently a local distortion occurs. In this case, a plastic material similar to the plastic material used for reflecting mirrors 3 and 4 or a die cast material is selected as the material of holding members 3a and 4a. As a result, although the surface shapes of the reflecting mirrors change, the projected image quality does not significantly degrade.

Additionally, plate 6 to which holding members 1a to 4a respectively holding reflecting mirrors 1 to 4 are fixed should always maintain the constant distances between the respective reflecting mirrors even if the temperature changes. Thus, a material having a low coefficient of linear expansion is selected as the material of the plate 6.

On the other hand, if proper materials cannot be selected for eliminating the influence of the linear expansion, and respective parts are susceptible to the influence of the radiant heat from lamp 8 at the same time, a mechanism is provided for releasing the distortions due to the linear expansion of the respective parts.

Figure 2:
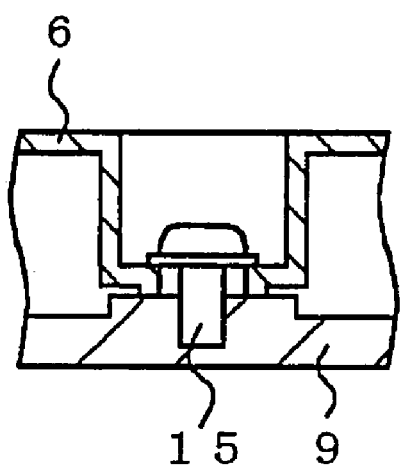
FIG. 2 is a cross sectional view showing a holding structure of the conventional projector apparatus.

As shown in FIG. 1 and FIG. 2, the conventional projector apparatus has such a serious problem as the warpage of plate 6 to which holding members 1a to 3a respectively holding reflecting mirrors 1 to 3 are fixed. The warpage of plate 6 occurs due to a force generated by the difference between the linear expansion of plate 6 and that of housing 9. In the present embodiment, a sliding mechanism is provided between housing 9 and plate 6 for releasing the force which generates the warpage of plate 6. Description will now be given of this sliding mechanism.

Figure 4A:
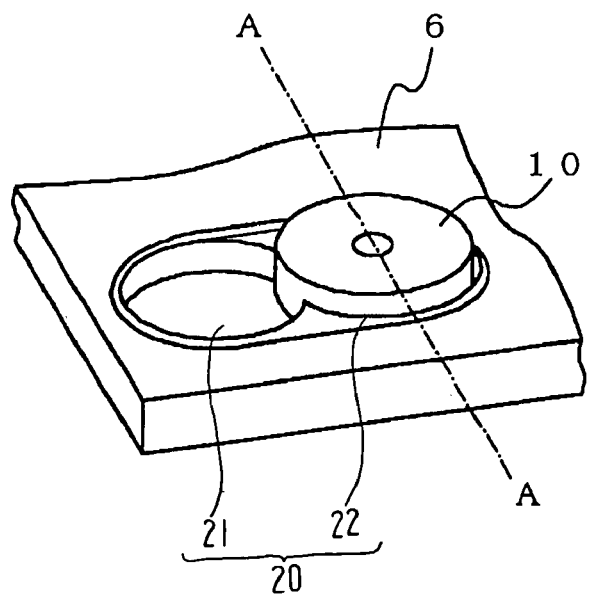
FIG. 4a is a perspective view showing an example of a sliding mechanism.
Figure 4B:
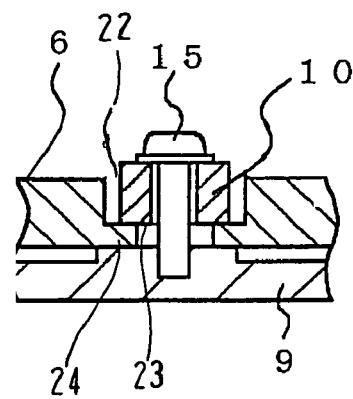
Figure 5:
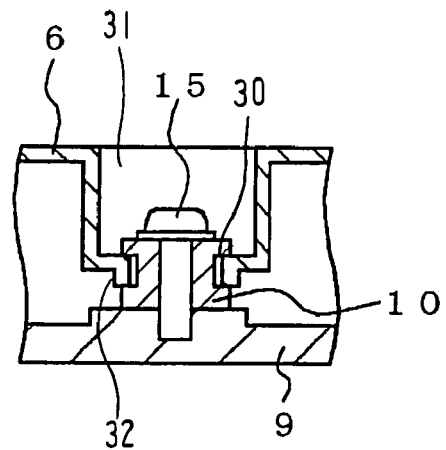
FIG. 5 is a cross sectional view showing another sliding mechanism.

FIG. 4a is a perspective view showing an example of the sliding mechanism and FIG. 4b is a cross sectional view taken along a line A—A in FIG. 4a. The sliding mechanism shown in FIG. 4a and FIG. 4b uses bush 10. FIG. 5 is a cross sectional view showing a variation of bush 10.

Bushes 10 shown in FIG. 4a, FIG. 4b, and FIG. 5 are made of an elastic material such as rubber, and have a through hole for passing through screw 15 at the center. Bush 10 shown in FIG. 4a and FIG. 4b has a cylindrical shape, and opening 20 in a shape of two overlapped circles including two holes 21 and 22 is formed on plate 6. Bush 10 is fit into one hole 22 of opening 20, and couples plate 6 and housing 9 to each other using screw 15 by sandwiching recessed portion 24 in opening 20 of plate 6 between bottom surface 23 and housing 9. When a distortion is generated on housing 9 due to a temperature change, a slide occurs between bottom surface 23 of bush 10 and recessed portion 24 in opening 20, and consequently the distortion of plate 6 is avoided. The force applied by bush 10 for coupling plate 6 and housing 9 to each other can be adjusted by changing the amount of the thread insertion of screw 15. When a force larger than a specified coupling force is acting between bottom surface 23 of bush 10 and recessed portion 24 of opening 20 due to a distortion of housing 9, a slide occurs between bottom surface 23 and recessed portion 24.

Groove 30 is circumferentially formed on the outer peripheral surface of bush 10 shown in FIG. 5. This bush 10 is fixed to housing 9 by screw 15 passing through the through hole. Plate 6 is fixed to housing 9 by fitting peripheral edges 32 of openings 31 formed at four corners of plate 6 into grooves 30. When a distortion is generated on housing 9 due to a temperature change, slides occur between grooves 30 of bushes 10 and peripheral edges 32 of openings 31 of plate 6 respectively fit into grooves 30, and consequently the distortion of plate 6 is avoided.

Figure 6:
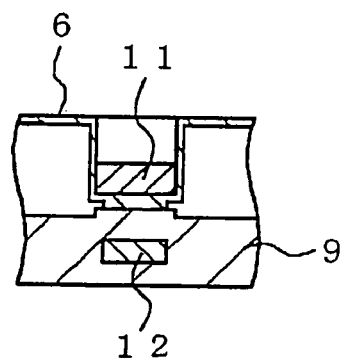
FIG. 6 is a cross sectional view showing another sliding mechanism.

FIG. 6 is a cross sectional view showing another sliding mechanism. A sliding mechanism shown in FIG. 6 is a sliding mechanism using a magnet. Magnet 11 is embedded into a recess of plate 6, and steel plate 12 is embedded into housing 9. Plate 6 is pressed against housing 9 by a constant attractive force between magnet 11 and steel plate 12. Even if the attached position between plate 6 and housing 9 is displaced by expansion of housing 9, since housing 9 and plate 6 are not completely fixed to each other, a slide is generated along the contact faces, and consequently a force distorting plate 6 is not generated.

Figure 7A:
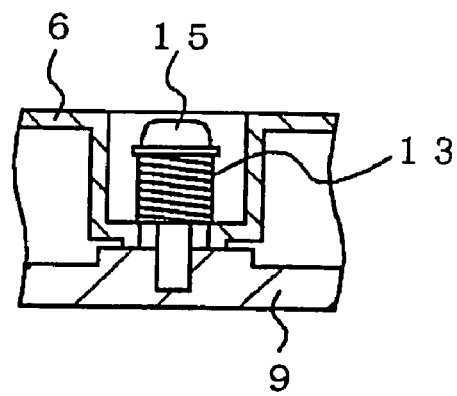
FIG. 7a is a cross sectional view showing another sliding mechanism when a temperature change is not present.
Figure 7B:
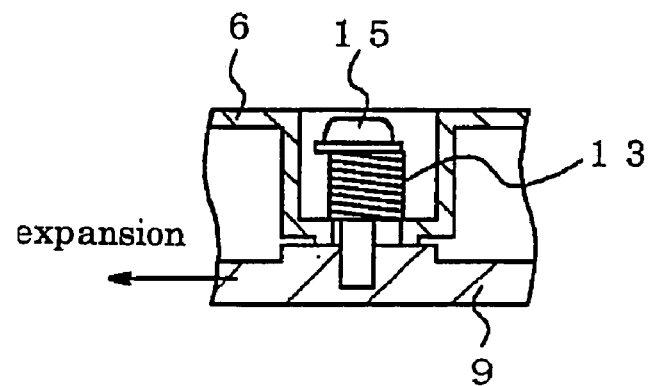
FIG. 7b is a cross sectional view showing the sliding mechanism shown in FIG. 7a when a temperature change occurs.

FIG. 7a and FIG. 7b are cross sectional views showing another sliding mechanism. The sliding mechanism shown in FIG. 7a and FIG. 7b presses plate 6 against housing 9 using a spring. As shown in FIG. 7a, this sliding mechanism has the structure which couples plate 6 to housing 9 using screw 15 through coil spring 13. Although plate 6 is always pressed against housing 9 by coil spring 13, plate 6 is not completely fixed to housing 9. Thus, when housing 9 is distorted by a linear expansion, a slide is generated between the respective contact faces of housing 9 and plate 6, and consequently the distortion of plate 6 is avoided. The force applied by coil spring 13 for coupling plate 6 to housing 9 (elastic recovery force) can be adjusted by changing the amount of thread insertion of screw 15. When a force exceeding the fixing force of coil spring 13 acts on the contact faces of housing 9 and plate 6 as a result of distortion of housing 9, a slide occurs between the contact faces.

Figure 8:
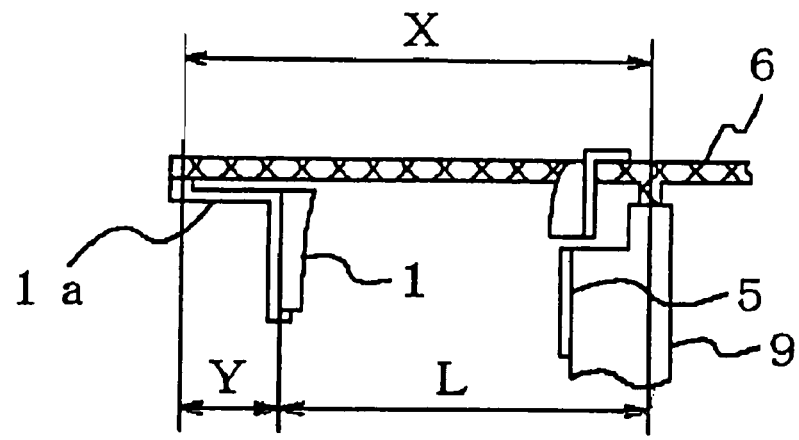
FIG. 8 is a schematic view showing another sliding mechanism.

FIG. 8 is a schematic view showing another sliding mechanism. The sliding mechanism shown in FIG. 8 has the structure for canceling a distortion by causing a holding member to expand in the opposite direction of the expansion of plate 6. Holding member 1a which holds reflecting mirror 1 and has the length of Y is made of such a material that when plate 6 having the length of X expands by "a", holding member 1a expands by "a" in the opposite direction of the expansion of plate 6 on equal temperature term. As a result, the relative change of the length "L" becomes zero, and consequently, the distance between reflecting mirror 1 and image forming element 5 is always maintained to be constant.

Figure 9:
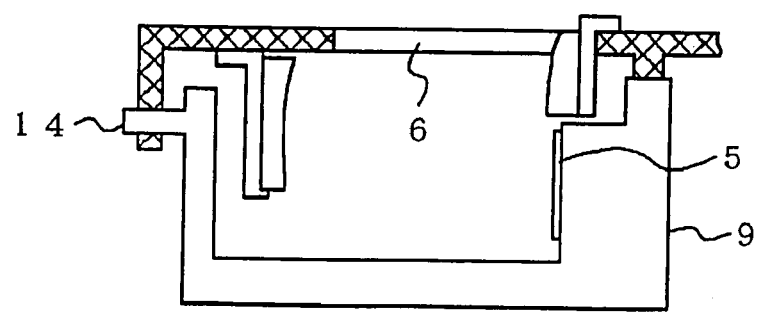
FIG. 9 is a schematic view showing another sliding mechanism.

FIG. 9 is a schematic view showing another sliding mechanism. Housing 9 is provided with pin 14 extended in the direction of the distortion of housing 9. Pin 14 passes through a hole provided on one side of plate 6. The opposite side of plate 6 is completely fixed to housing 9. In case of an expansion or a shrinkage of plate 6 due to a temperature change, pin 14 moves sliding inside the hole. Thus, a force which distorts plate 6 does not act on plate 6.

While preferred embodiments of the present invention have been described using specific terms, such descriptions are for illustrative purposes only, and it is to be understood that changes and variations may be made without departing from the spirit or scope of the following claims.

What is claimed is:
1. A projector apparatus comprising:
a housing;
a light source apparatus arranged in said housing;
an image forming element which receives light from said light source apparatus and forms an image for projection;
a plate fixed to said housing; and
an image forming optical system including a reflecting mirror attached to said plate through a holding member, wherein the material of said reflecting mirror and the materials of said holding member have approximately equal coefficients of linear expansion.
2. The projector apparatus according to claim 1, wherein the material of said plate have low coefficients of linear expansion.

* * * * *